US008903684B2

(12) United States Patent
Yun

(10) Patent No.: US 8,903,684 B2
(45) Date of Patent: Dec. 2, 2014

(54) DETERMINATION METHOD AND APPARATUS FOR THE NUMBER OF MULTI-FEED ELEMENTS IN MULTI-BEAM ANTENNA

(75) Inventor: So Hyeun Yun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 244 days.

(21) Appl. No.: 13/293,081

(22) Filed: Nov. 9, 2011

(65) Prior Publication Data

US 2012/0123752 A1 May 17, 2012

(30) Foreign Application Priority Data

Nov. 12, 2010 (KR) ........................ 10-2010-0112759

(51) Int. Cl.

| | |
|---|---|
| ***G06F 17/50*** | (2006.01) |
| ***G06F 7/60*** | (2006.01) |
| ***G06F 7/48*** | (2006.01) |
| ***H01Q 19/17*** | (2006.01) |
| ***H01Q 25/00*** | (2006.01) |
| *H01Q 13/02* | (2006.01) |
| *H01Q 19/13* | (2006.01) |
| *H01Q 5/00* | (2006.01) |

(52) U.S. Cl.

CPC ............. *H01Q 19/17* (2013.01); *H01Q 13/025* (2013.01); *H01Q 19/132* (2013.01); *H01Q 25/007* (2013.01); *H01Q 5/0024* (2013.01)

USPC ........................................ 703/1; 703/2; 703/3

(58) Field of Classification Search

None

See application file for complete search history.

(56) References Cited

U.S. PATENT DOCUMENTS

| | | | | |
|---|---|---|---|---|
| 6,384,795 | B1 * | 5/2002 | Bhattacharyya et al. | 343/786 |
| 6,396,453 | B2 * | 5/2002 | Amyotte et al. | 343/786 |
| 7,183,991 | B2 * | 2/2007 | Bhattacharyya et al. | 343/786 |
| 2006/0125706 | A1 * | 6/2006 | Amyotte et al. | 343/786 |

FOREIGN PATENT DOCUMENTS

KR 20080092218 A 10/2008

OTHER PUBLICATIONS

"Design of High Efficiency Circular Horn Feeds for Multibeam Reflector Applications", Chan et al. IEEE Transactions on Antennas and Propagation, vol. 56, No. 1, Jan. 2008.*

So-hyeun Yun et al., "Electrical Design of a Multi-beam Large Antenna for Satellite Payload", International Symposium on Antennas and Propagation (ISAP), Nov. 26, 2010.

* cited by examiner

*Primary Examiner* — Omar Fernandez Rivas
*Assistant Examiner* — Nithya J Moll
(74) *Attorney, Agent, or Firm* — Rabin & Berdo, P.C.

(57) ABSTRACT

Provided is a method and apparatus for determining the number of feed elements in a multi-beam antenna. Provided is a method and apparatus capable of determining the number of feed elements to be installed in an antenna and thereby estimating a size of the antenna in order to efficiently configure an antenna for forming multiple beams. In particular, when configuring the antenna for providing the multiple beams, the number of feed elements to be installed in the antenna may be quickly computed.

5 Claims, 8 Drawing Sheets

DETERMINATION METHOD AND APPARATUS FOR THE NUMBER OF MULTI-FEED ELEMENTS IN MULTI-BEAM ANTENNA

TECHNICAL FIELD

Embodiments of the present invention relate to a method and apparatus for determining the number of feed elements in a multi-beam antenna, and more particularly, to a method and apparatus capable of determining the number of feed elements to be installed in an antenna and thereby estimating a size of the antenna in order to efficiently configure a multi-beam antenna.

BACKGROUND ART

Since a reflector antenna configures multiple beams by installing a plurality of feed elements in a feed unit, a physical size of the reflector antenna may significantly increase.

In an initial stage of designing a multi-beam antenna, there is a need to verify an antenna development probability in advance. To verify the antenna development probability, a relatively large amount of time and efforts may be used to estimate a size of an antenna including a feed element and to perform a simulation in a conventional art.

Multiple beams may be generated by selecting a feed element with respect to a desired beam direction using a method such as a ray path, a geometric optics (GO), and the like. To verify an electrical performance of a beam, an electromagnetic field interpretation of a reflector may be performed by configuring a cluster including the selected feed element, and by exciting a signal magnitude and phase suitable for each feed element.

An electromagnetic field interpretation method may include a physical optics (PO) and the like, and may need to be performed repeatedly as many as the number of multiple beams and the number of feed elements that constitute each beam.

For example, when the number of multiple beams is "19" and the number of feed elements constituting each cluster is "5", an electromagnetic field interpretation process for a multi-beam configuration may be performed repeatedly 19 (number of multiple beams)×5 (number of feed elements)×2 (GO and PO)=190 times.

Accordingly, in the conventional art, it is possible to estimate an antenna size and to determine the antenna development probability by repeatedly performing electromagnetic field interpretation with respect to the reflector. Also, when the antenna size is not suitable, an iterative operation may need to be additionally performed and thus, a development may be delayed.

DISCLOSURE OF INVENTION

Technical Goals

An aspect of the present invention provides a method and apparatus for determining the number of feed elements in a multi-beam antenna that may quickly compute the number of feed elements to be installed in an antenna when configuring the antenna for forming multiple beams.

An aspect of the present invention also provides a method and apparatus for determining the number of feed elements in a multi-beam antenna that may provide the optimal number of feed elements within a multi-beam antenna by automatically computing the number of feed elements based on a target efficiency of the multi-beam antenna.

Technical Solutions

According to an aspect of the present invention, there is provided a method of determining the number of feed elements in an antenna for forming multiple beams, the method including: computing a target efficiency of the antenna based on information associated with a performance requirement of the antenna; generating data that indicates relationship between an efficiency of the antenna and the number of feed elements; and outputting the number of feed elements corresponding to the target efficiency of the antenna based on the data that indicates relationship between the efficiency of the antenna and the number of feed elements.

The computing may include: computing a maximum gain and efficiency of the antenna using a service coverage gain of the antenna, a diameter of an aperture, a wavelength, and a beam width; and determining the target efficiency of the antenna based on the computed maximum gain and efficiency.

The generating may include: estimating the efficiency of the antenna and the number of feed elements having at least a boundary signal level among a plurality of feed elements based on a deviation angle of the antenna; and generating data for estimating relationship between the number of feed elements and the efficiency of the antenna based on the estimation result.

The method may further include determining, as a trade-off requiring efficiency based on the data that indicates relationship between the efficiency of the antenna and the number of feed elements, the efficiency of the antenna that increases the number of feed elements by at least a predetermined value.

According to another aspect of the present invention, there is provided an apparatus for determining the number of feed elements in an antenna for forming multiple beams, the apparatus including: an efficiency computing unit to compute a target efficiency of the antenna based on information associated with a performance requirement of the antenna; a data generator to generate data that indicates relationship between an efficiency of the antenna and the number of feed elements; and an output unit to output the number of feed elements corresponding to the target efficiency of the antenna based on the data that indicates relationship between the efficiency of the antenna and the number of feed elements.

The efficiency computing unit may compute a maximum gain and efficiency of the antenna using a service coverage gain of the antenna, a diameter of an aperture, a wavelength, and a beam width, and may determine the target efficiency of the antenna based on the computed maximum gain and efficiency.

The data generator may estimate the efficiency of the antenna and the number of feed elements having at least a boundary signal level among a plurality of feed elements based on a deviation angle of the antenna, and may generate data for estimating relationship between the number of feed elements and the efficiency of the antenna based on the estimation result.

According to still another aspect of the present invention, there is provided a simulation apparatus for an antenna for forming multiple beams, including: an efficiency computing unit to compute a target efficiency of the antenna based on information associated with a performance requirement of the antenna; a data generator to generate data that indicates relationship between an efficiency of the antenna and the number of feed elements; and a trade-off processing unit to determine, as a trade-off requiring efficiency based on the data that indicates relationship between the efficiency of the antenna and the number of feed elements, the efficiency of the antenna that increases the number of feed elements by at least a predetermined value.

Effect

According to embodiments of the present invention, it is possible to check promptly a development probability of a multi-beam antenna and a development cost thereof by quickly estimating a size of a reflector and the number of feed elements for the multi-beam antenna.

BEST MODE FOR CARRYING OUT THE INVENTION

Figure 1:
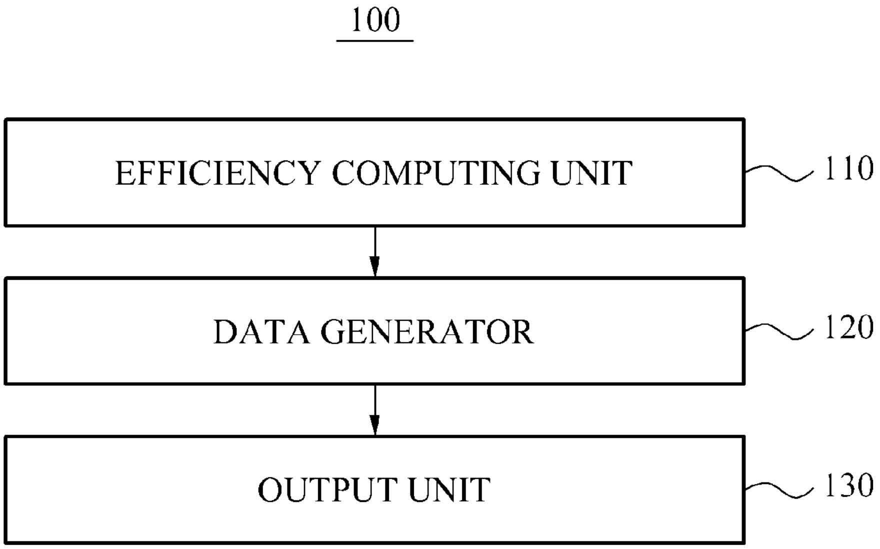
FIG. 1 is a block diagram to describe a configuration of an apparatus for performing a method of determining the number of feed elements in a multi-beam antenna according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Hereinafter, embodiments of the present invention will be described with reference to the accompanying drawings.

FIG. 1 is a block diagram to describe a configuration of an apparatus 100 for performing a method of determining the number of feed elements in a multi-beam antenna according to an embodiment of the present invention.

Referring to FIG. 1, the apparatus 100 may include an efficiency computing unit 110, a data generator 120, and an output unit 130.

The efficiency computing unit 110 may compute a target efficiency of an antenna based on information associated with a performance requirement of the antenna.

Here, the antenna may include a single offset reflector and feed elements in which a plurality of phases is arranged. In multiple beams of the antenna, each beam may be configured using a cluster. Each cluster may be configured as a single feed element or a feed element set. Therefore, when a size of a reflector is given as a design requirement of the antenna, the number of feed elements to be installed in the antenna may become a major variable that is used to determine the size of the antenna and the size of the reflector.

When an individual beam of the antenna is formed by a single feed element, it may be easy to estimate the number of feed elements since the number of feed elements corresponding to the number of individual beams is required. However, when individual beams of the antenna are formed by a feed element set, it may be difficult to estimate the number of feed elements to be installed in the feed element set with only the number of individual beams.

Therefore, the efficiency computing unit 110 may compute the target efficiency of the antenna based on information associated with the performance requirement of the antenna. Here, information associated with the performance requirement of the antenna may include at least one of a service coverage gain of the antenna, a diameter of an aperture, a wavelength, and a beam width.

The efficiency computing unit 110 may compute the efficiency of the antenna based on information associated with the performance requirement according to Equation 1:

$$\eta = G_{max}\left(\frac{\lambda}{\pi D^2}\right) \quad \text{[Equation 1]}$$

In Equation 1, η denotes the efficiency of the antenna, $G_{max}$ denotes the maximum gain of the antenna, λ denotes the wavelength, and D denotes the diameter of the aperture. When an edge of coverage (EOG) gain of a service coverage having the beam width of 2θ is given as the requirement, the efficiency computing unit 110 may compute the maximum gain of the antenna according to Equation 2:

$$G(\theta)_{dB} = G_{max,dB} - 12\left(\frac{\theta}{\theta_{3dB}}\right)^2 \quad \text{[Equation 2]}$$

In Equation 2, θ denotes the beam width from a center of the service coverage to an edge of the service coverage, and $\theta_{3\ dB}$ denotes a value obtained by approximating the beam width of 3 dB using 70λ/D. Also, $G(\theta)_{dB}$ denotes a value obtained by changing a gain at the edge of the service coverage using a unit of dB, and $G_{max,dB}$ denotes a value obtained by changing the maximum gain $G_{max}$ of the antenna using a unit of dB.

Next, the efficiency computing unit 110 may determine the target efficiency of the antenna based on the maximum gain of the antenna and the efficiency of the antenna.

The data generator 120 may generate data that indicates relationship between the efficiency of the antenna and the number of feed elements.

Figure 2:
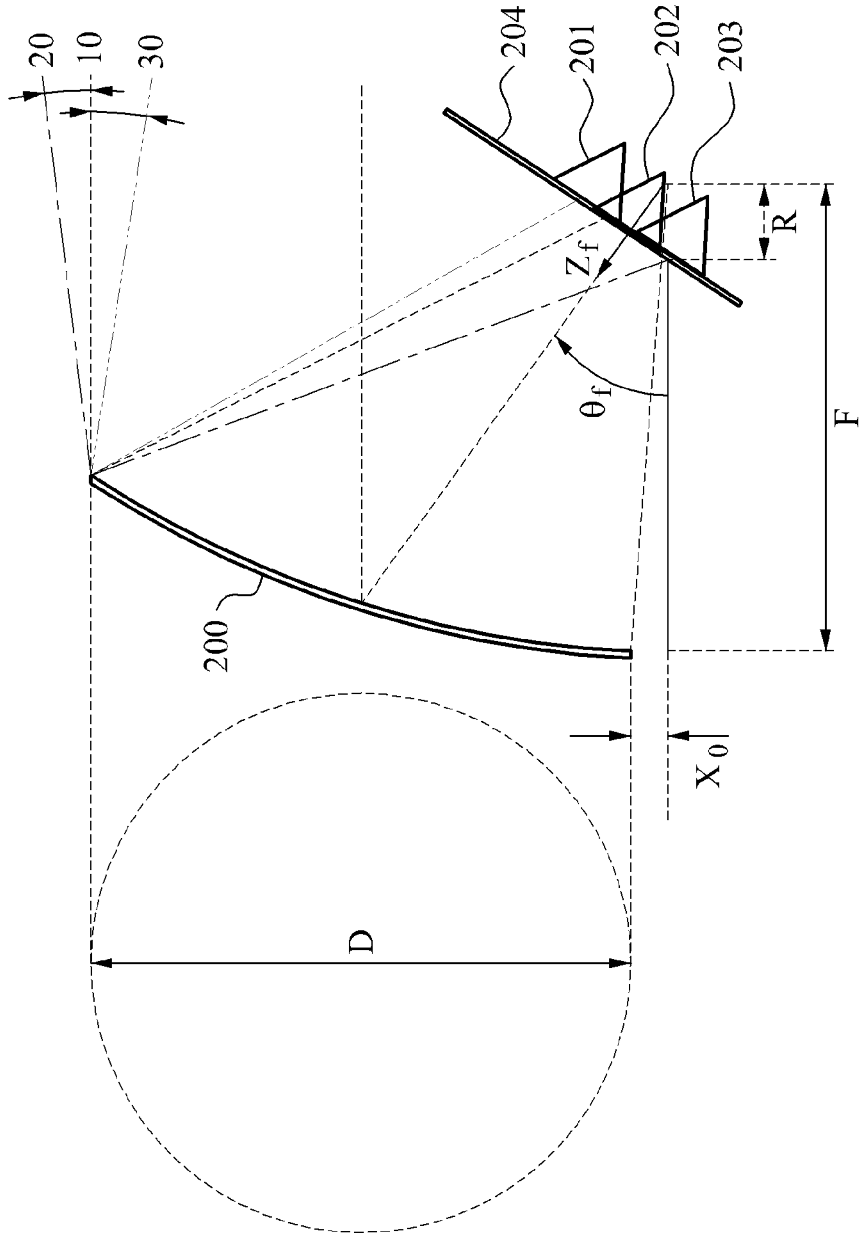
FIG. 2 is a diagram to describe a configuration of a multi-beam antenna configured in a method of determining the number of feed elements in a multi-beam antenna according to an embodiment of the present invention.

Referring to FIG. 2, the antenna may include a single offset reflector 200 and feed elements in which a plurality of phases is arranged. Here, the feed elements may constitute a feed element set, and have a feed element surface 204. A feed element 202 is positioned at a focus within the feed element surface 204 and thus, may excite an electromagnetic wave like a path 10 via the reflector 200. Feed elements 201 and 203 are positioned on the feed element surface 204 excluding the focus and thus, may excite an electromagnetic wave like a path 20 or 30 via the reflector 200 and may have an angle deviated with respect to a focal axis.

The data generator 120 may obtain a position of an individual beam based on the angle deviated with respect to the focal axis, by verifying a wave path.

Here, a performance of an individual beam may depend on an electromagnetic field excited by a feed element and thus, the feed element may be assumed as an element having a numerical value pattern. For this, the data generator 120 may synthesize patterns of feed elements having at least a boundary signal level among arranged feed elements.

Figure 3:
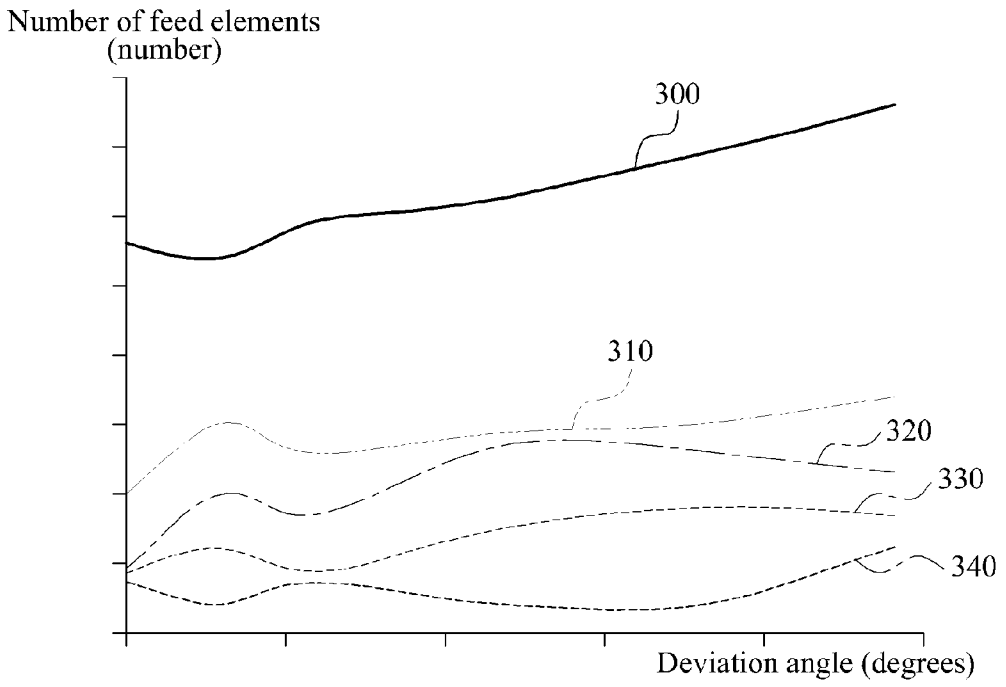
FIG. 3 is a graph to describe relationship between a deviation angle of a beam and the number of feed elements in a method of determining the number of feed elements in a multi-beam antenna according to an embodiment of the present invention.

When an aperture of the antenna is assumed as about 200λ, the number of feed elements having at least a boundary signal level may be shown as a graph of FIG. 3. Referring to FIG. 3, the antenna operates in a receive mode and the boundary signal level may become a boundary used for selecting an element having at least a predetermined signal level.

For example, a curve 300 corresponds to a case where the boundary signal level is −25 dB. Here, the number of feed elements having the signal level greater than the boundary signal level of −25 dB is computed based on a geometric optics and thereby is shown for each deviation angle of the antenna. Also, a curve 310 corresponds to a case where the boundary signal level is −20 dB. Here, the number of feed elements having the signal level greater than the boundary signal level of −20 dB is computed based on the geometric optics and thereby is shown for each deviation angle of the antenna. Similarly, a curve 320 corresponds to a case where the boundary signal level is −18 dB, a curve 330 corresponds to a case where the boundary signal level is −15 dB, and a curve 340 corresponds to a case where the boundary signal level is −12 dB. Here, the number of feed elements having the signal level greater than −18 dB, −15 dB, and −12 dB is computed based on the geometric optics and thereby is shown for each deviation angle of the antenna, respectively.

Accordingly, the number of feed elements having at least the boundary signal level may increase according to a decrease in a magnitude of the boundary signal level and may also vary with respect to a deviation angle of a beam.

A cluster may include feed elements that are selected based on a magnitude of the boundary signal level, and a pattern of an individual beam may be interpreted using a physical optics (PO) interpretation method.

Accordingly, the data generator 120 may compute the efficiency of the antenna by computing a maximum gain of the antenna based on the PO interpretation method and by comparing the computed maximum gain and a target gain of the antenna. A graph of FIG. 4 shows the antenna efficiency according to the boundary signal level.

Figure 4:
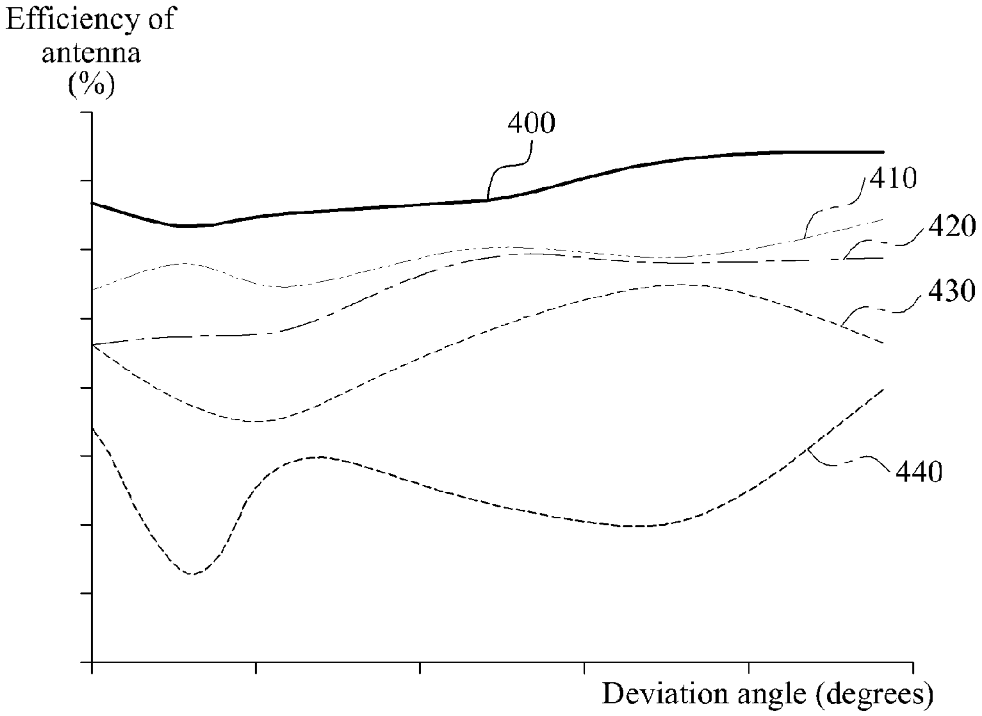
FIG. 4 is a graph to describe relationship between a deviation angle of a beam and antenna efficiency in a method of determining the number of feed elements in a multi-beam antenna according to an embodiment of the present invention.

Referring to FIG. 4, a curve 400 corresponds to a case where the boundary signal level is −25 dB. Here, the computed efficiency of the antenna is shown for each deviation angle of the beam. Similarly, a curve 410 corresponds to a case where the boundary signal level is −dB, a curve 420 corresponds to a case where the boundary signal level is −18 dB, a curve 430 corresponds to a case where the boundary signal level is −15 dB, and a curve 440 corresponds to a case where the boundary signal level is −12 dB. Here, the efficiency of the antenna computed for each boundary signal level is shown for each deviation angle of the beam.

Therefore, it can be known that the efficiency of the antenna increases according to a decrease in a magnitude of the boundary signal level. In particular, as an embodiment, the curve 400 shows the antenna efficiency of about 70% when the magnitude of the boundary signal level becomes a level of −25 dB.

Accordingly, the data generator 120 may estimate the efficiency of the antenna and the number of feed elements having at least the boundary signal level among the plurality of feed elements based on the deviation angle of the antenna. Next, the data generator 120 may generate data that indicates relationship between the efficiency of the antenna and the number of feed elements according to the magnitude of the boundary signal level, based on the estimation result.

Figure 5:
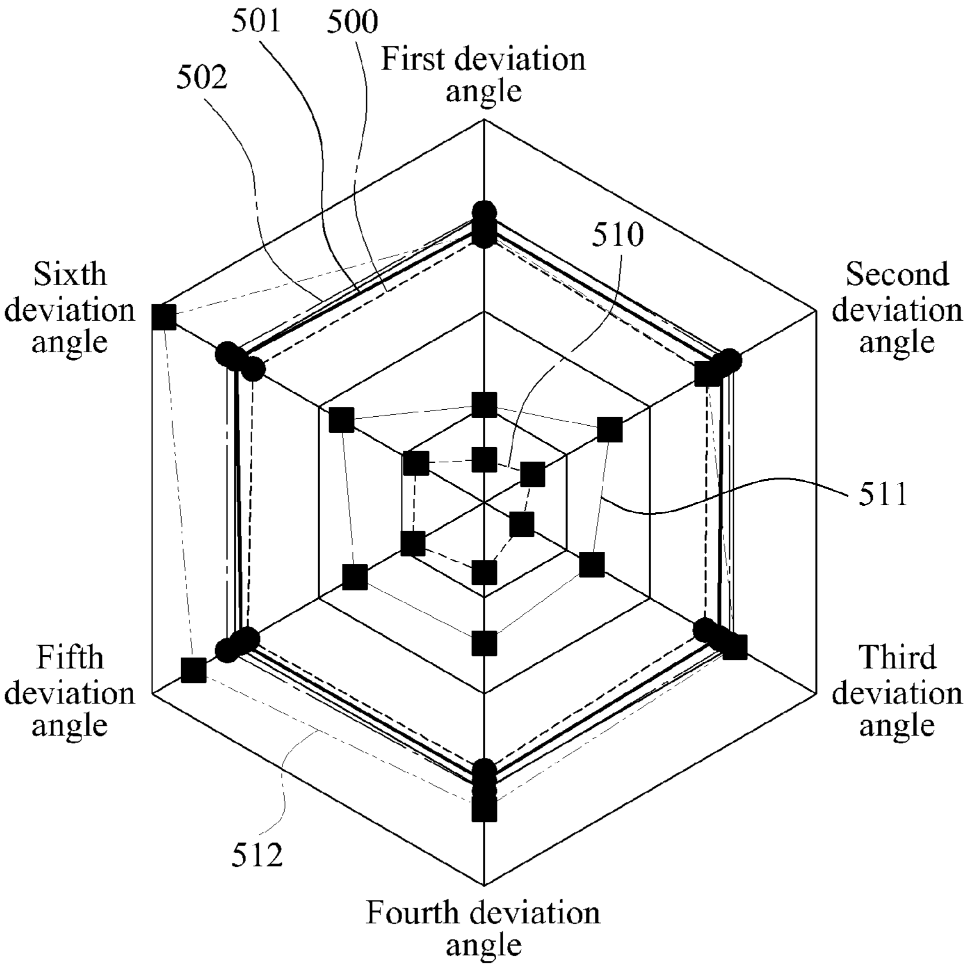
FIG. 5 through FIG. 7 are graphs to describe relationship between antenna efficiency and the number of feed elements in a method of determining the number of feed elements in a multi-beam antenna according to an embodiment of the present invention.

FIG. 5 is a graph to describe relationship between the efficiency of the antenna and the number of feed elements having at least the boundary signal level among the plurality of feed elements.

Referring to FIG. 5, in a radial graph, a circumferential direction value refers to first to sixth deviation angles of a beam and a radial direction value refers to the efficiency of the antenna or the number of feed elements.

A line 500 indicates antenna efficiency and a deviation angle of when the boundary signal level is 15 dB, a line 501 indicates antenna efficiency and a deviation angle of when the boundary signal level is 20 dB, and a line 502 indicates antenna efficiency and a deviation angle of when the boundary signal level is 25 dB.

Also, a line 510 indicates a deviation angle of when the boundary signal level is 15 dB and the number of feed elements having the single level greater than 15 dB, a line 511 indicates a deviation angle of when the boundary signal level is 20 dB and the number of feed elements having the single level greater than 20 dB, and a line 512 indicates a deviation angle of when the boundary signal level is 25 dB and the number of feed elements having the single level greater than 25 dB.

That is, it can be known that the efficiency of the antenna and the number of feed elements increases according to a decrease in the magnitude of the boundary signal level. The efficiency of the antenna and the number of feed elements may vary based on the deviation angle and may have the overall contour line shape. When arranging the above result based on the antenna efficiency, the result shown in a graph of FIG. 6 may be provided as an embodiment.

Figure 6:
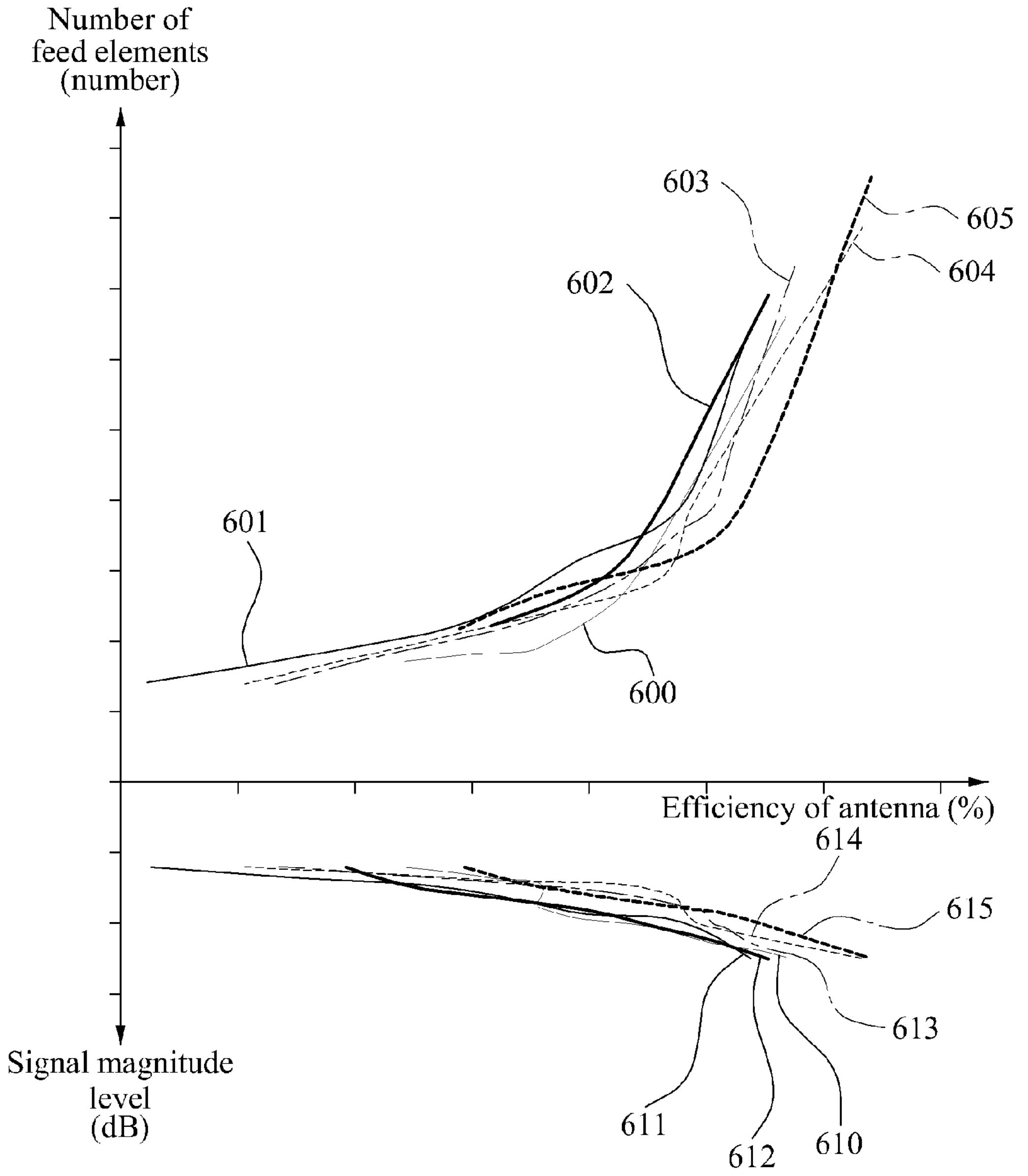

Referring to FIG. 6, a curve 600 indicates the number of feed elements and the antenna efficiency of when the deviation angle is zero degrees, a curve 601 indicates the number of feed elements and the antenna efficiency of when the deviation angle is 0.3 degrees, and curves 602, 603, 604, and 605 indicate the number of feed elements and the antenna efficiency of when the deviation angles are 0.6 degrees, 1.2 degrees, 1.8 degrees, and 2.4 degrees, respectively.

Similarly, curves 610, 611, 612, 613, 614, and 615 indicate the signal magnitude level and the antenna efficiency of when the deviation angles are zero degrees, 0.3 degrees, 0.6 degrees, 1.2 degrees, 1.8 degrees, and 2.4 degrees, respectively.

The boundary signal level used herein is reference information used to determine the number of feed elements during the electromagnetic field interpretation process and thus, a predetermined boundary signal level may be assumed to be used. Accordingly, the number of feed elements may be determined to correspond to the efficiency of the antenna.

Figure 7:
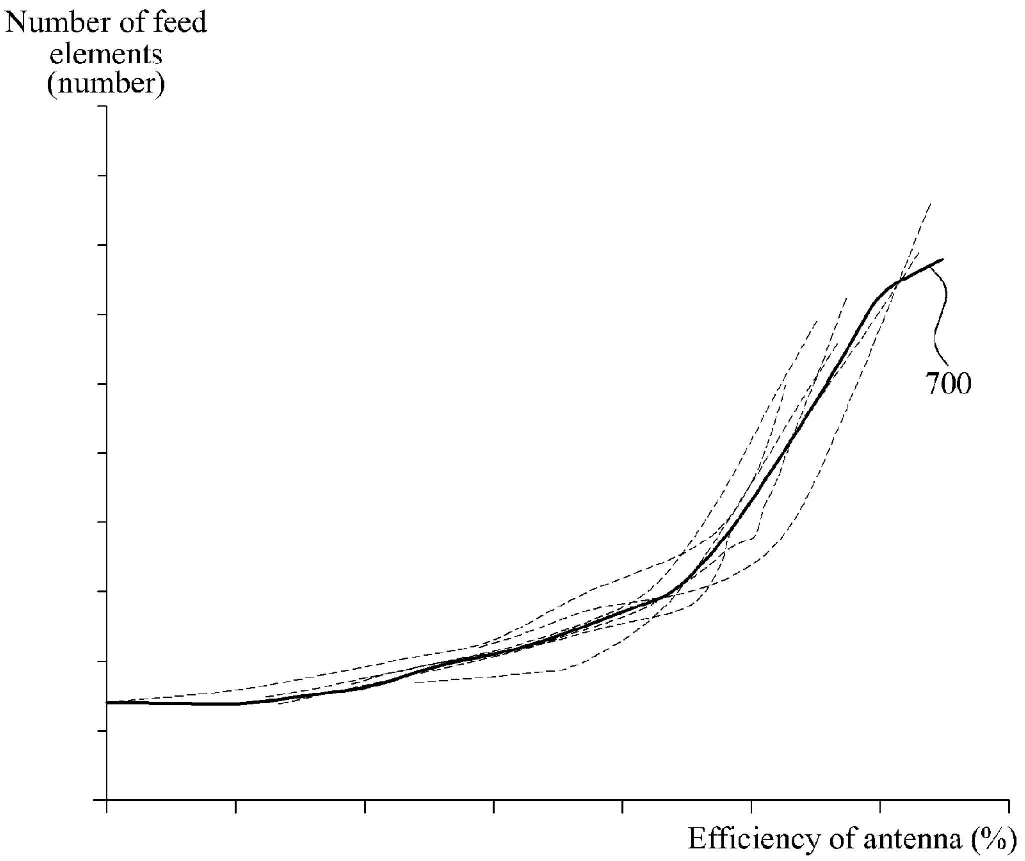

In particular, when the deviation angle of the beam is present with a predetermined range, for example, within the range of zero degrees to 2.4 degrees, the number of feed elements and the efficiency of the antenna may be independent with respect to the deviation angle, as shown in a graph of FIG. 7.

Referring to FIG. 7, dotted curves show the number of feed elements and the efficiency of antenna according to deviation angles, for example, zero degrees, 0.3 degrees, 0.6 degrees, 1.2 degrees, 1.8 degrees, and 2.4 degrees, respectively. Based on the number of feed elements and the efficiency of the antenna according to the above deviation angles, the data generator 120 may generate data capable of estimating relationship between the number of feed elements and the efficiency of the antenna as shown in a curve 700.

Next, the output unit 130 may extract the number of feed elements corresponding to the target efficiency of the antenna based on the data generated by the data generator 120.

Figure 8:
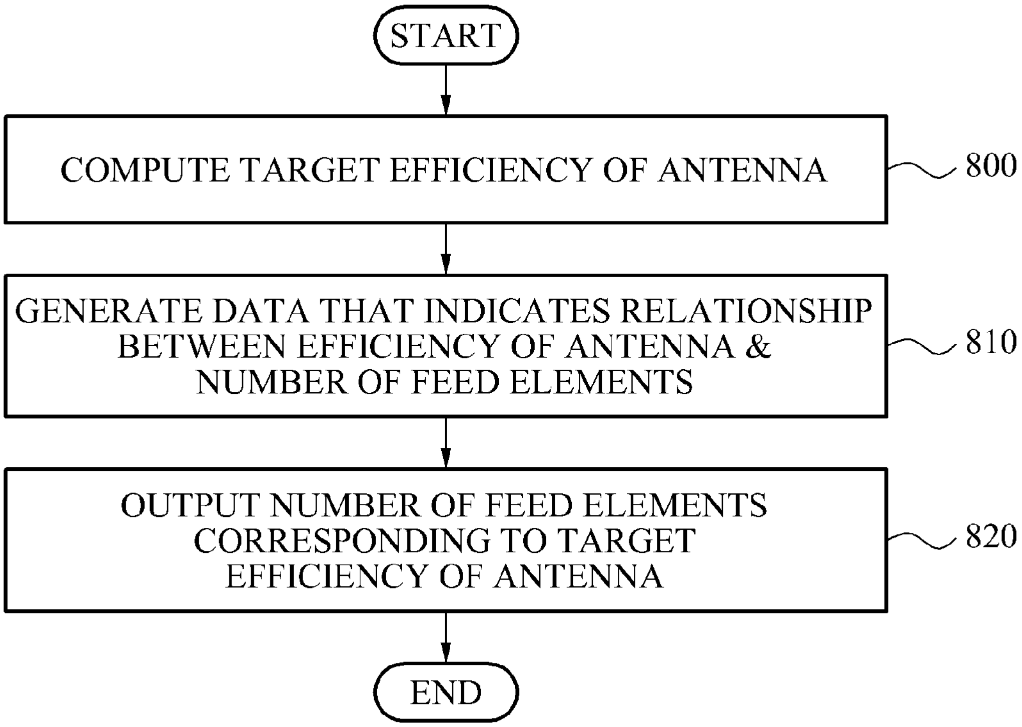
FIG. 8 is a flowchart to describe a method of determining the number of feed elements in a multi-beam antenna according to an embodiment of the present invention.

FIG. 8 is a flowchart to describe a method of determining the number of feed elements in a multi-beam antenna according to an embodiment of the present invention.

Referring to FIG. 8, in operation 800, a target efficiency of an antenna may be computed based on information associated with a performance requirement of the antenna.

In particular, in operation 800, a maximum gain and efficiency of the antenna may be computed using at least one of a service coverage gain of the antenna, a diameter of an aperture, a wavelength, and a beam width. The target efficiency of the antenna may be determined based on the computed maximum gain and efficiency.

In operation 810, data that indicates relationship between an efficiency of the antenna and the number of feed elements may be generated.

In particular, in operation 810, the efficiency of the antenna and the number of feed elements having at least a boundary signal level among a plurality of feed elements may be estimated based on a deviation angle of the antenna. Data for estimating relationship between the number of feed elements and the efficiency of the antenna may be generated based on the estimation result.

In operation 820, the number of feed elements corresponding to the target efficiency of the antenna may be output based on the data that indicates relationship between the efficiency of the antenna and the number of feed elements.

Meanwhile, in order to achieve a tradeoff at a system level in a starting stage of an antenna development, the data generated by the data generator 120 may be useful.

For example, it can be shown from the graph of FIG. 7 that the number of feed elements significantly increases when the antenna efficiency becomes to be greater than a predetermined value, for example, 68%. In the antenna efficiency of the predetermined value, the tradeoff at the system level may need to be performed.

Therefore, the apparatus 100 for performing the method of determining the number of feed elements in the multi-beam antenna according to the present invention may further include a tradeoff determining unit to determine a necessity of the tradeoff with respect to the antenna.

The tradeoff determining unit may determine, as a tradeoff requiring efficiency based on the data that indicates relationship between the efficiency of the antenna and the number of feed elements, the efficiency of the antenna that increases the number of feed elements by at least a predetermined value.

The above-described exemplary embodiments of the present invention may be recorded in computer-readable media including program instructions to implement various operations embodied by a computer. The media may also include, alone or in combination with the program instructions, data files, data structures, and the like. Examples of program instructions recorded in the media may be specially designed for the present invention or may be known to those skilled in the computer software art.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A non-transitory computer readable medium including a computer program stored thereon for determining an optimal number of feed elements in an antenna for forming multiple beams, the computer program comprising instructions for causing the computer to perform the steps of:

computing a target efficiency of the antenna based on information associated with a performance requirement of the antenna;

generating data that corresponds to a curve indicating a relationship between an efficiency of the antenna and a number of feed elements, the curve showing a plurality of antenna efficiency values each corresponding to one of a plurality of feed element numbers;

wherein the generating comprises:

estimating the efficiency of the antenna and the number of feed elements having at least a boundary signal level among a plurality of feed elements based on a deviation angle of the antenna; and generating data for estimating relationship between the number of feed elements and the efficiency of the antenna based on a result of the estimation;

outputting the optimal number of feed elements corresponding to the target efficiency of the antenna based on the data that indicates the relationship between the efficiency of the antenna and the number of feed elements.

2. The non-transitory computer readable medium of claim 1, wherein the computing comprises:

computing a maximum gain and the efficiency of the antenna using a service coverage gain of the antenna, a diameter of an aperture, a wavelength, and a beam width; and determining the target efficiency of the antenna based on the computed maximum gain and efficiency.

3. The non-transitory computer readable medium of claim 1, further comprising:

determining, as a trade-off requiring efficiency based on the data that indicates the relationship between the efficiency of the antenna and the number of feed elements, the efficiency of the antenna that increases the number of feed elements by at least a predetermined value.

4. A method of producing a multi-beam antenna, comprising:

obtaining a service coverage gain of the antenna, a diameter of an aperture of the antenna, a wavelength of the antenna, and a beam width of the antenna;

calculating, using a computing device, a target efficiency of the antenna using the obtained service coverage gain, aperture diameter, wavelength and beam width of the antenna;

ascertaining, using the computing device, a target number of feed elements using the calculated target efficiency and a curve indicating a relationship between an efficiency of the antenna and a number of feed elements in the antenna, the curve showing a plurality of antenna efficiency values each corresponding to one of a plurality of feed element numbers;

installing the target number of feed elements in the antenna;

computing, using the computing device, the relationship between the efficiency of the antenna and the number of feed elements in the antenna;

wherein the computing includes:

estimating the efficiency of the antenna and a number of feed elements having at least a boundary signal level based on a deviation angle of the antenna; and computing the relationship between the number of feed elements having at least the boundary signal level and the efficiency of the antenna based on a result of the estimation.

5. The method of claim 4, further comprising:

determining a trade-off for the antenna when the efficiency of the antenna is larger than a predetermined value.

* * * * *